United States Patent [19]

Langenkamp

[11] Patent Number: 4,656,513
[45] Date of Patent: Apr. 7, 1987

[54] DATA SLICER CIRCUIT FOR SEPARATING AND RECOVERING DIGITAL TELETEXT SIGNALS

[75] Inventor: Ulrich Langenkamp, Freiburg, Fed. Rep. of Germany

[73] Assignee: ITT Industries, Inc., New York, N.Y.

[21] Appl. No.: 676,556

[22] Filed: Nov. 30, 1984

[30] Foreign Application Priority Data

Dec. 7, 1983 [EP] European Pat. Off. ......... 83112294.0

[51] Int. Cl.$^4$ ............................................. H04N 7/087
[52] U.S. Cl. ....................................... 358/147; 358/13
[58] Field of Search ............... 358/147, 146, 142, 153, 358/148, 12, 13

[56] References Cited

U.S. PATENT DOCUMENTS 4,318,128 3/1982 Sauvanet .............................. 358/147

Primary Examiner—Tommy P. Chin
Assistant Examiner—David E. Harvey
Attorney, Agent, or Firm—Donald J. Lenkszus

[57] ABSTRACT

A data slicer circuit for separating and recovering digital teletext signals from a demodulated composite color signal derives the slicing level by using a framing code detector and a gating pulse having an active phase during horizontal and color sync pulses. By an adder or a multiplier, a start value is formed at the beginning of each picture line. A square wave reference signal is formed which is subtracted from the start value containing composite color signal. From the difference signal, a digital automatic control system forms the slicing level.

14 Claims, 5 Drawing Figures

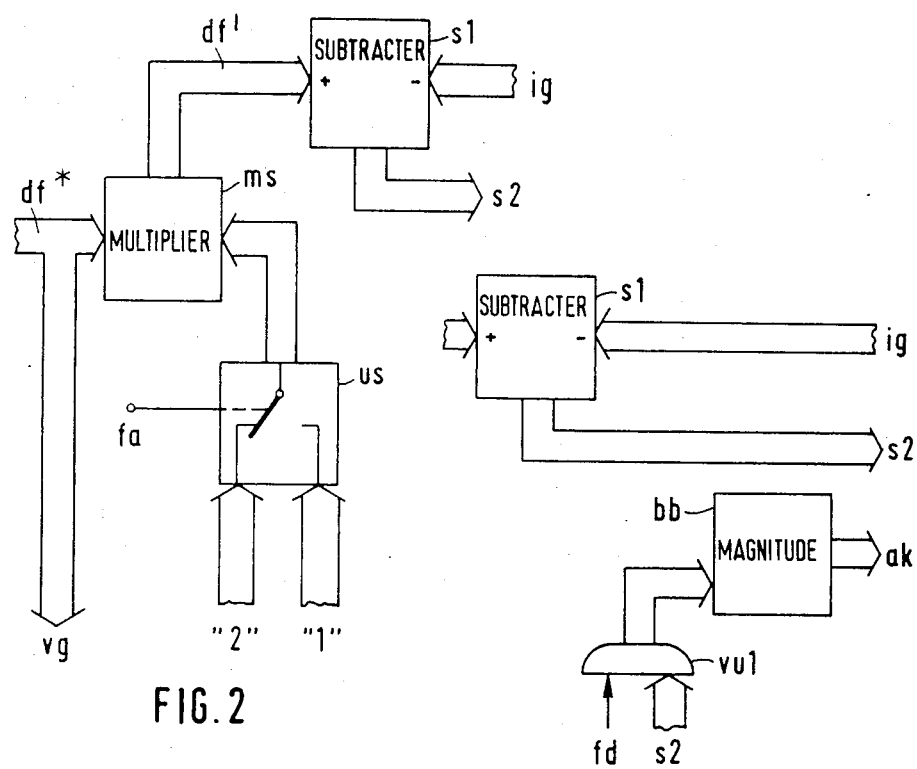
FIG. 2
FIG. 3
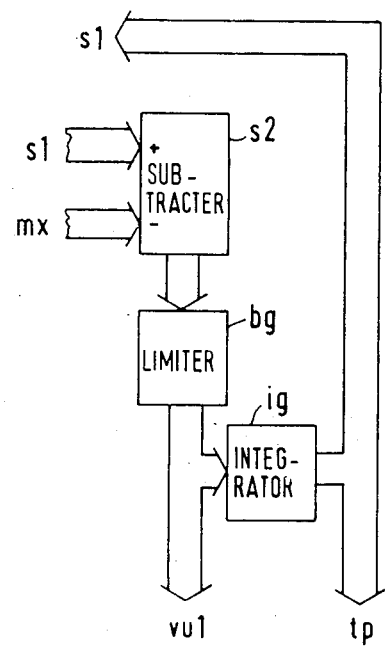
FIG. 4

DATA SLICER CIRCUIT FOR SEPARATING AND RECOVERING DIGITAL TELETEXT SIGNALS

BACKGROUND OF THE INVENTION

The present invention relates to a data slicer circuit for separating and recovering digital teletext signals from the composite color signal demodulated in color-television receivers. More specifically, the present invention pertains to a data slicer circuit wherein a slicing level is derived from the teletext signals with the aid of a framing-code detector and a gating pulse whose active phase is present at least for the duration of the horizontal- and color-sync pulses.

The necessity of such a data slicer circuit is explained in the journal "Funkschau", 1977, pages 820 to 824 and 882 to 887, in an article entitled "Die Grundlagen von Teletext und Viewdata", particularly page 882, right column, to page 884 in connection with FIGS. 15 and 16. The circuit shown in FIG. 16, a "dynamic data slicer", primarily consists of an arrangement for rectifying and storing the peak and valley values of the data current. FIG. 16 shows a rectifier circuit for this purpose which consists of diodes, resistors, and capacitors. FIG. 17 on page 884 shows various waveforms occurring with the European teletext standard. It can be seen that the teletext signals follow the color burst in time. A clock run-in is followed by a framing code with is followed by the actual teletext data signals. FIG. 17 also shows that during the active phase of horizontal-, vertical-, and color-sync pulses (color burst), a gating signal, designated there by Q1, is produced by the circuit.

It is one object of the invention to provide a fully digital data slicer circuit for a digital television receiver, i.e., a circuit which processes the already digitized composite color signal in digital fashion. Digital signal processing into television receivers is known per se from the journal "electronics", Aug. 11, 1981, pages 97 to 103.

SUMMARY OF THE INVENTION

A data slicer circuit in accordance with the principles of the invention derives the slicing level from the demodulated and digital composite color signal by using a framing code detector and a gating pulse whose active phase occurs during horizontal and color sync pulses. The circuit is designed for parallel signal processing.

By means of an adder or a multiplier, a start value is formed at the beginning of each picture line. A square wave reference signal is formed which is subtracted from the start value containing composite color signal. From the difference signal, a digital automatic control system forms the slicing level. One advantage of the invention is that the slicing level, which is superimposed on the digital composite color signal, precisely follows this signal. This is not the case with the previous solution using analog signal processing. In addition, many successive zeros or ones can be correctly recognized.

BRIEF DESCRIPTION OF THE DRAWINGS

The invention will now be explained in more detail with reference to the accompanying drawings, in which:

FIG. 2 shows a variant of the input portion of FIG. 1 in which the adder has been replaced by a multiplier;

FIG. 3 shows another variant of the circuit of FIG. 1 in which the multiplier has been replaced by a magnitude stage;

FIG. 4 shows a further variant of the circuit of FIG. 1 in which a digital limiter has been inserted behind the output of the second substracter.

DETAILED DESCRIPTION

Figure 1:
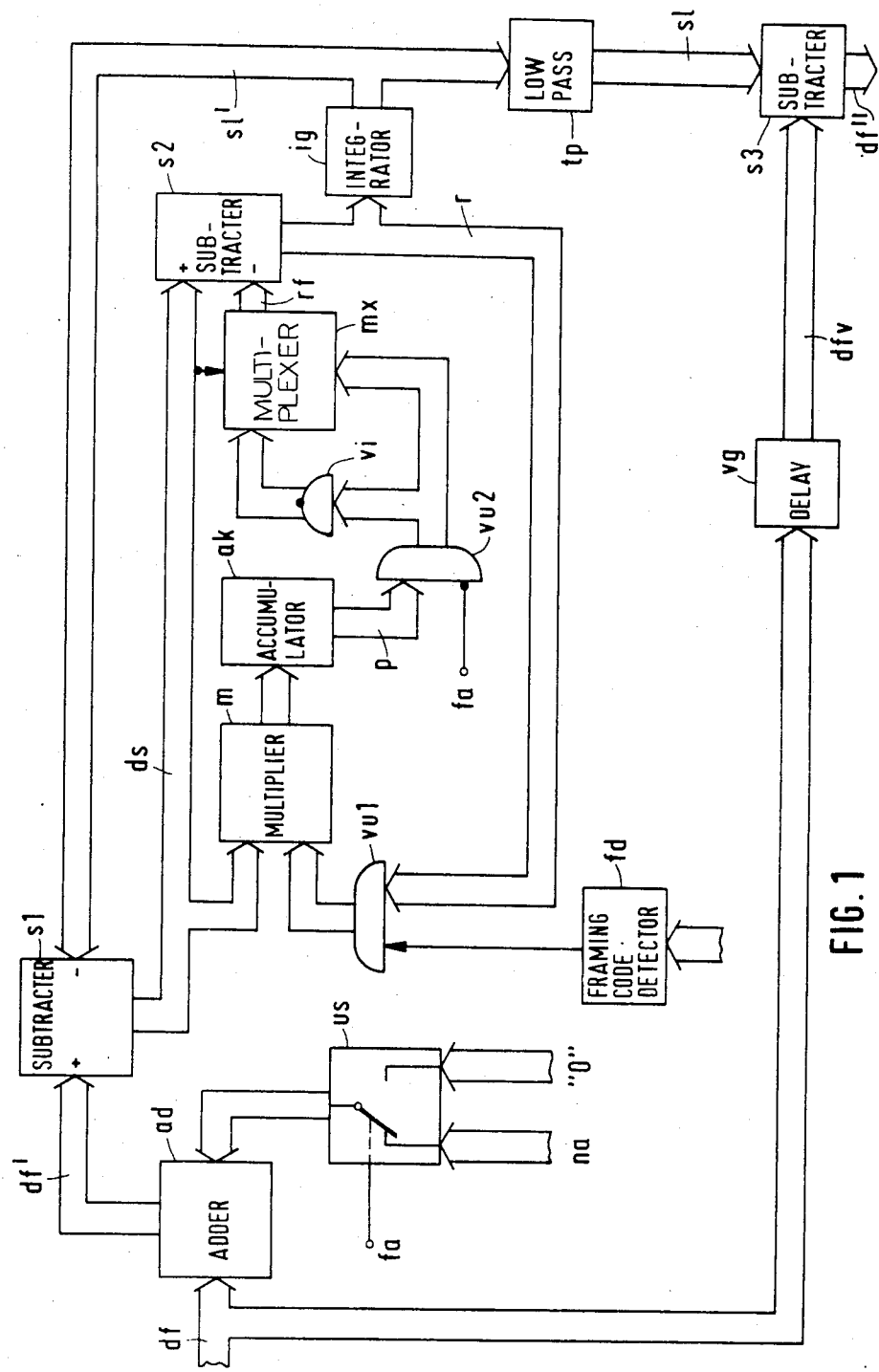
FIG. 1 is a block diagram of a preferred embodiment of the invention.

In the preferred embodiment of the invention shown in FIG. 1, it is assumed that the composite color signal is already present in digital form as a digital composite color signal df, as is the case in television receivers with digital signal processing circuitry. The stripelike interconnecting leads between the individual subcircuits indicate that the data slicer circuit is designed to process the digital composite color signal df in parallel. The subcircuits used are thus "parallel" subcircuits, i.e., parallel adders, parallel subtracters, and parallel multipliers in particular.

The digital composite color signal df is applied to the first input of the adder ad and to the input of the delay element vg. The output of the adder ad is coupled to the minuend input of the first subtracter s1, and its second input is connected to the output of the multiposition switch us. The control input of the latter is presented with the gating pulses fa, which are assumed here to be at the more positive level, the H level, of the two binary levels H and L for the duration of the horizontal- and color-sync pulses. The position of the multiposition switch us shown in FIG. 1 is the position during this active phase of the gating pulses fa.

The digital arithmetic mean na of the standard amplitudes of the teletext signals is applied to the first input of the multiposition switch us. According to FIG. 11 on page 882 of "Funkschau", 1977, this is the numerical value lying in the middle between the two levels designated there by binary "0" and binary "1". If the black level and the white level are defined as 0% and 100% respectively, of the maximum picture brightness, the two teletext levels are at 0% and 66%, respectively. A signal "0", corresponding to the numerical value zero, is applied to the second input of the multiposition switch us. Thus, during the gating pulse fa, the above-mentioned mean na of the standard amplitudes is ditigally added to the digital composite color signal df by the adder ad, and during the remaining times of the a picture line, the digital composite color signal df is applied to the minuend input of the first subtracter s1 unchanged. By this step of the invention, a threshold level close to the optimum slicing level is preset at the beginning of each picture line, so that the clock run-in and the framing code can be reliably and correctly recognized. The minuend input of the first subtracter is thus presented with the start-value-containing composite color signal df'.

Accordingly to the variant shown in FIG. 2, the adder ad can be replaced by the multiplier ms, in which case a signal "2", corresponding to the decimal numerical value 2, and a signal "1", corresponding to the numerical value 1, are applied to the first and second inputs, respectively, of the multiposition switch us. In the variant, the digital composite color signal df is thus doubled in value by means of the multiplier ms during the active phase of the gating pulses fa; this, too, permits reliable recognition of the clock run-in and the framing code. In addition, the digital composite color signal applied to the first input of the multiplier ms must, in this case, be such a signal df* with a black level at 25% of the maximum picture brightness.

In FIG. 1, the output of the first subtracter s1 is coupled to the minuend input of the second subtracter s2 and to the first input of the multiplier m, whose second input is connected to the output of the first multiple AND gate vu1, which has its first input connected to the output of the framing-code detector fd. The output of the multiplier m is coupled to the input of the digital accumulator ak.

The output of the accumulator ak is connected to the first input of the second multiple AND gate vu2, whose second input is presented with the gating pulses fa, and whose output is connected, directly and through the multiple inverter vi, respectively, to two inputs of the multiplexer mx. The output of the multiplexer mx is coupled to the subtrahend input of the second subtracter s2, and the control input of the multiplexer is connected to the sign-digit-carrying output line of the first subtracter s1.

The subcircuits m, ak, mx, vi and vu1 measure the amplitude of the teletext signal in the digital composite color signal in condition that the teletext-signal amplitude changes only very slowly, which will mostly be the case under given receiving conditions. The output signal of the framing-code detector fd, which is applied to one input of the first multiple AND gate vu1, causes this amplitude measurement to be performed only in those picture lines which contain teletext signals.

The output of the second subtracter s2 is followed by the digital integrator ig, whose output is coupled to the subtrahend input of the first subtracter s1 and, through the digital low-pass filter tp, to the subtrahend input of the third subtracter s3. The latter has its minuend input connected to the output of the delay element vg, and its output provides the digital composite color signal df", on which the slicing level has been superimposed. The delay provided by the delay element vg must be chosen to be equal to the delay introduced by the digital low-pass filter tp.

FIG. 3 shows that portion of the circuit of FIG. 1 which contains the subcircuits s1, m, and vu1, but the multiplier m of FIG. 1 has been replaced by the magnitude stage bb; this eliminates the need of the connection to the output of the first subtracter s1. If negative input signals are applied to the magnitude former bb, the output signal of the latter is the positive signal corresponding to the numerical value of the input signal.

FIG. 4 shows a further variant of the invention in which the digital limiter bg has been inserted between the output of the second subtracter s2 and the inputs of the integrator ig and the first multiple AND gate vu1. The positive and negative limiting values of the limiter must be chosen to be equal to a fraction of the maximum output-signal value of the accumulator ak.

For the further explanation of the operation of the reference circuit, reference will be made to the reference characters entered in the figures for signals in addition to the reference characters mentioned above. The slicing level s1 is determined, generally speaking, by subtracting the teletext signal from the digital composite color signal df. Since, however, the exact waveform of the teletext signals is unknown or not reproducible, the reference signal rf, a square-wave signal with the amplitude p of the output signal of the accumulator ak, is produced. The result of the aforementioned subtraction is the error signal r at the output of the second subtracter s2.

If the reference signal rf is zero, the subcircuit consisting of the first and second subtracters s1, s2 and the integrator ig represents a recursive low-pass filter for the signal df'. The output signal of the filter is the signal s1' at the output of the integrator ig. This signal s1' should, as far as possible, contain all frequency components of any interference signal superimposed on the digital composite color signal df. It is thus required that the time constant of the integrator ig should be as long as possible. On the other hand, the error signal r contains high-frequency spurious components which are due to the square waveform of the reference signal rf and to the fact that the error signal r changes in the rhythm of the teletext data. This component of the error signal r should be suppressed as far as possible to make the slicing level s1 independent of the transmitted teletext data. This requires that the time constant of the integrator should be as short as possible. Thus, two contradictory requirements have to be fulfilled with respect to this time constant.

The invention fulfills these two requirements by three alternative measures, namely by the use of either the digital low-pass filter tp or, instead of or in addition to the low-pass filter tp, the limiter bg. With the low-pass filter tp, the data-dependent spurious components still present in the output signal s1' of the integrator ig are suppressed, with the signal delay caused by the low-pass filter tp being so compensated by means of the delay element vg that the slicing level s1 accurately follows the delayed digital composite color signal dfv.

If the limiter bg is inserted, the maximum rate at which the circuit can follow an interference signal will be reduced, but so will the data-dependent interference signals.

The circuit according to the invention thus causes the slicing level s1 to follow the delayed digital composite color signal. This is particularly important if the interference signal superimposed on the teletext signals has a frequency clearly below the transmitted data rate.

Figure 5:
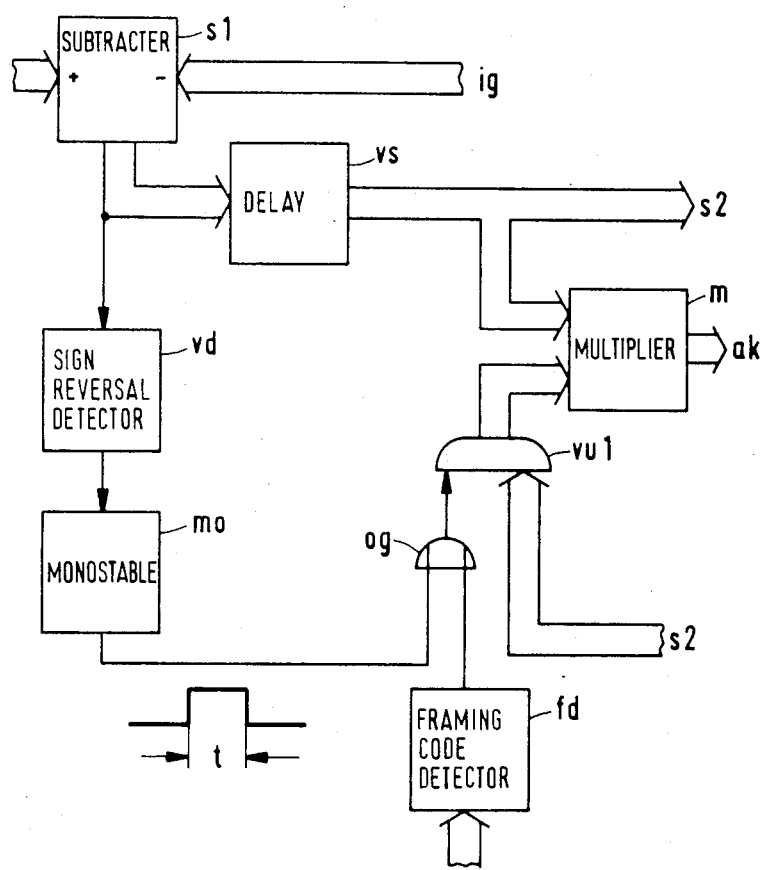
FIG. 5 shows a further development of the invention.

The embodiment of the FIG. 5 represents a further improvement of the invention. In the variants of the invention explained thus far, an amplitude value p of the output signal ds, which is comparable to an effective value, is determined by means of the accumulator ak, the multiplexer mx, the second multiple AND gate vu2, and the multiple inverter vi. This follows from the fact that the 0-to-1 transitions of the teletext signal are not very steep, i.e., rounded, so that this amplitude value depends on the actual number of successive ones and zeros. The actual amplitude value of the output signal ds is obtained if the delay stage vs is inserted between the output of the first subtracter s1, on the on hand, and the minuend input of the second subtracter s2 and one input of the multiplier m, on the other hand, if the sign-digit-carrying output line of the first substracter s1 is connected to the input of the sign-reversal detector vd, whose output controls a digital monostable multivibrator mo, if the OR gate og is located between the output of the framing-code detector fd and one input of the first multiple AND gate vu1 and has its other input connected to the output of the monostable multivibrator mo, and if the delay provided by the delay stage vs is equal to half the duration t of the output pulse of the monostable multivibrator mo.

By this improvement, the amplitude measurement is suppressed shortly before and shortly after a 0-to-1 transition, so that only the peak values of the teletext signals are digitally evaluated. This improvement thus takes up the idea contained in the above-mentioned printed publication, namely to perform a peak-value evaluation, which, however, is a conventional analog peak-value rectification there, and implements this idea by digital means.

The duration t of the output pulse of the monostable multivibrator is about 100 ms.

What is claimed is:

1. A data slicer circuit for providing a digital composite color signal having a slicing level superimposed thereon for use in separating and recovering digital teletext signals from said digital composite color signal having horizontal and color sync pulses, said circuit comprising:

an adder having first addend inputs receiving said digital composite color signal, second addend inputs and outputs;

selector means having first inputs receiving a digital arithmetic means of standard amplitudes of said teletext signals, second inputs receiving a signal corresponding to a predetermined numerical value, outputs coupled to said adder second addend inputs, and a control input receiving gating pulses, for coupling either said arithmetic mean or said signal corresponding to a predetermined numerical value to said second addend inputs in response to said gating pulses;

said gating pulses causing said selector means to couple said arithmetic mean to said second addend inputs for duration of the horizontal and color sync pulses;

first and second subtracters;

a digital integrator having inputs coupled to outputs of said second subtracter and outputs coupled to subtrahend inputs of said first subtracter said first subtracter having minuend inputs coupled to said adder outputs, and having outputs coupled to minuend inputs of said second subtracter;

a framing code detector;

logic gate means for gating an output of said framing code detector with the outputs of said second subtracter to provide first gated outputs only in picture lines that contain the teletext signals;

a multiplier having first inputs coupled to said logic gate means first gated outputs, second inputs coupled to said first subtracter outputs, and having outputs;

an accumulator having inputs coupled to said multiplier outputs;

logic means for gating outputs of said accumulator with said gating pulses to provide second gated outputs, and for inverting said second gated outputs to provide inverted outputs;

a multiplexer having first inputs coupled to said second gated outputs, second inputs coupled to said inverted outputs, and outputs coupled to subtrahend inputs of said second subtracter;

a third subtracter;

a digital low pass filter coupling the outputs of said integrator to subtrahend inputs of said third subtracter;

delay means for coupling said digital composite color signal to minuend inputs of said third subtracter with a delay equal to a delay of said digital low pass filter;

outputs of said third subtracter providing said digital composite color signal having the slicing level superimposed thereon.

2. A data slicer circuit in accordance with claim 1 further comprising:

a digital limiter interposed between said second subtracter outputs, inputs of said logic gate means and the inputs of said integrator, said accumulator having a maximum output signal level, and said digital limiter having positive and negative limiting values equal to a fraction of the maximum output signal level of said accumulator.

3. A data slicer circuit in accordance with claim 1 further comprising:

a delay stage coupled between said second subtracter minuend inputs and said multiplier first inputs;

a sign reversal detector having an output and having an input coupled to one of said first subtracter outputs which corresponds to a sign digit;

a monostable multivibrator having a control input coupled to said sign reversal detector output;

an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and wherein the delay produced by said delay stage is equal to one half the duration of an output pulse of said monostable multivibrator.

4. A data slicer circuit in accordance with claim 2 further comprising:

a delay stage coupled between said second subtracter minuend inputs and said multiplier first inputs;

a sign reversal detector having an output and having an input coupled to one of said first subtracter outputs which corresponds to a sign digit;

a monostable multivibrator having a control input coupled to said sign reversal detector output;

an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and wherein the delay produced by said delay stage is equal to one half the duration of an output pulse of said monostable multivibrator.

5. A data slicer circuit for providing a digital composite color signal having a slicing level superimposed thereon for use in separating and recovering digital teletext signals from said digital composite color signal having horizontal and color sync pulses, said circuit comprising:

an adder having first addend inputs receiving said digital composite color signal, second addend inputs and outputs;

selector means having first inputs receiving a digital arithmetic mean of standard amplitudes of said teletext signals, second inputs receiving a signal corresponding to a predetermined numerical value, outputs coupled to said adder second addend inputs, and a control input receiving gating pulses, for coupling either said arithmetic mean or said signal corresponding to a predetermined numerical value to said second addend inputs in response to said gating pulses;

said gating pulses causing said selector means to couple said arithmetic mean to said second addend inputs for duration of the horizontal and color sync pulses;

first and second subtracters;

a digital integrator having inputs coupled to outputs of said second subtracter and outputs coupled to subtrahend inputs of said first subtracter said first subtracter having minuend inputs coupled to said adder outputs, and having outputs coupled to minuend inputs of said second subtracter;

a framing code detector;

logic gate means for gating an output of said framing code detector with the outputs of said second subtracter to provide first gated outputs only in picture lines that contain the teletext signals;

a magnitude stage having inputs coupled to said logic gate means first gated outputs, and having outputs;

an accumulator having inputs coupled to said magnitude stage outputs;

logic means for gating outputs of said accumulator with said gating pulses to provide second gated outputs, and for inverting said second gated outputs to provide inverted outputs;

a multiplexer having first inputs coupled to second gated outputs, second inputs coupled to said inverted outputs, and outputs coupled to subtrahend inputs of said second subtracter;

a third subtracter;

a digital low pass filter coupling the outputs of said integrator to the subtrahend inputs of said third subtracter;

delay means for coupling said digital composite color signal to minuend inputs of said third subtracter with a delay equal to a delay of said digital low pass filter;

outputs of said third subtracter providing said digital composite color signal having the slicing level superimposed thereon.

6. A data slicer circuit in accordance with claim 5 further comprising:

a digital limiter interposed between said second subtracter outputs, inputs of said logic gate means and the inputs of said integrator, said accumulator having a maximum output signal level, and said digital limiter having positive and negative limiting values equal to a fraction of the maximum output signal level of said accumulator.

7. A data slicer circuit for providing a digital composite color signal having a slicing level superimposed thereon for use in separating and recovering digital teletext signals from said digital composite color signal having horizontal and color sync pulses and having a black level at 25% of the maximum picture brightness, said circuit comprising:

a first multiplier having first inputs receiving said digital composite color signal, second inputs and outputs;

selector means having first inputs receiving a first signal representing a decimal numerical value of two, second inputs receiving a second signal corresponding to a decimal numerical value of one, outputs coupled to said first multiplier second inputs, and a control input receiving gating pulses, for coupling either said first signal or said second signal to said first multiplier second inputs in response to said gating pulses;

said gating pulses causing said selector means to couple said first signal to said first multiplier second inputs for duration of the horizontal and color sync pulses;

first and second subtracters;

a digital integrator having inputs coupled to outputs of said second subtracter and outputs coupled to subtrahend inputs of said first subtracter said first subtracter having minuend inputs coupled to said first multiplier outputs, and having outputs coupled to minuend inputs of said second subtracter;

a framing code detector;

logic gate means for gating an output of said framing code detector with the outputs of said second subtracter to provide first gated outputs only in picture lines that contain the teletext signals;

a second multiplier having first inputs coupled to said logic gate means first gated outputs, second inputs coupled to said first subtracter outputs, and having outputs;

an accumulator having its inputs coupled to said second multiplier outputs;

logic means for gating outputs of said accumulator with said gating pulses to provide second gated outputs, and for inverting said second gated outputs to provide inverted outputs;

a multiplexer having first inputs coupled to said second gated outputs, second inputs coupled to said inverted outputs, and outputs coupled to subtrahend inputs of said second subtracter;

a third subtracter;

a digital low pass filter coupling the outputs of said integrator to subtrahend inputs of said third subtracter;

delay means for coupling said digital composite color signal to minuend inputs of said third subtracter with a delay equal to a delay of said digital low pass filter;

outputs of said third subtracter providing said digital composite color signal having the slicing level superimposed thereon.

8. A data slicer circuit in accordance with claim 7 further comprising:

a digital limiter interposed between said second subtracter outputs, inputs of said logic gate means and the inputs of said integrator, said accumulator having a maximum output signal level, and said digital limiter having positive and negative limiting values equal to a fraction of the maximum output signal level of said accumulator.

9. A data slicer circuit in accordance with claim 7 further comprising:

a delay stage coupled between said second subtracter minuend inputs and said second multiplier first inputs;

a sign reversal detector having an output and having an input coupled to one of said first subtracter outputs which corresponds to a sign digit;

a monostable multivibrator having a control input coupled to said sign reversal detector output;

an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and wherein the delay produced by said delay stage is equal to one half the duration of an output pulse of said monostable multivibrator.

10. A data slicer circuit in accordance with claim 8 further comprising:
   a delay stage coupled between said second subtracter minuend inputs and said second multiplier first inputs;
   a sign reversal detector having an output and having an input coupled to one of said first subtracter outputs which corresponds to a sign digit;
   a monostable multivibrator having a control input coupled to said sign reversal detector output;
   an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and
   wherein the delay produced by said delay stage is equal to one half the duration of an output pulse of said monostable multivibrator.

11. A data slicer circuit for providing a digital composite color signal having a slicing level superimposed thereon for use in separating and recovering digital teletext signals from said digital composite color signal having horizontal and color sync pulses and having a black level at 25% of the maximum picture brightness, said circuit comprising:
   a multiplier having first inputs receiving said digital composite color signal, second inputs and outputs;
   selector means having first inputs receiving a first signal representing the decimal numerical value of two, second inputs receiving a second signal corresponding to a decimal numerical value of one, outputs coupled to said first multiplier second inputs, and a control input receiving gating pulses, for coupling either said first signal or said second signal to said first multiplier second inputs in response to said gating pulses;
   said gating pulses causing said selector means to couple said first signal to said multiplier second inputs for duration of the horizontal and color sync pulses;
   first and second subtracters;
   a digital integrator having inputs coupled to outputs of said second subtracter and outputs coupled to subtrahend inputs of said first subtracter
   said first subtracter having minuend inputs coupled to said multiplier outputs, and having outputs coupled to minuend inputs of said second subtracter;
   a framing code detector;
   logic gate means for gating an output of said framing code detector with outputs of said second subtracter to provide first gated outputs only in picture lines that contain the teletext signals;
   a magnitude stage having inputs coupled to said logic gate means first gated outputs, and having outputs;
   an accumulator having inputs coupled to said magnitude stage outputs;
   second logic means for gating outputs of said accumulator with said gating pulses to provide second gated outputs, and for inverting said second gated outputs to provide inverted outputs;
   a multiplexer having first inputs coupled to said second gated outputs, second inputs coupled to said inverted outputs, and outputs coupled to subtrahend inputs of said second subtracter;
   a third subtracter;
   a digital low pass filter coupling the outputs of said integrator to subtrahend inputs of said third subtracter;
   delay means for coupling said digital composite color signal to minuend inputs of said third subtracter with a delay equal to a delay of said digital low pass filter;
   outputs of said third subtracter providing said digital composite color signal having the slicing level superimposed thereon.

12. A data slicer circuit in accordance with claim 11 further comprising:
   a digital limiter interposed between said second subtracter outputs, inputs of said logic gate means the inputs of said integrator, said accumulator having a maximum output signal level, and said digital limiter having positive and negative limiting values equal to a fraction of the maximum output signal level of said accumulator.

13. A data slicer circuit in accordance with claim 11 further comprising:
   a delay stage coupled between said second subtracter minuend inputs and said multiplier first inputs;
   a sign reversal detector having an output and having an input coupled to one of said first subtracter outputs which corresponds to a sign digit;
   a monostable multivibrator having a control input coupled to said sign reversal detector output;
   an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and
   wherein the delay produced by said delay stage is equal to one half the duration of an output pulse of said monostable multivibrator.

14. A data slicer circuit in accordance with claim 12 further comprising:
   a delay stage coupled between said second subtracter minuend inputs and said multiplier first inputs;
   a sign reversal detector having an output and having its input coupled to one of said first subtracter outputs which corresponds to a sign digit;
   a monostable multivibrator having a control input coupled to said sign reversal detector output;
   an OR gate interposed between said framing code detector and said logic gate means such that one input of said OR gate is connected to said output of said framing code detector and an output of said OR gate is connected to said logic gate means, said OR gate having a second input coupled to an output of said monostable multivibrator; and
   wherein the delay produced by said delay stage is equal to one half the duration of an output pulse of said monostable multivibrator.

* * * * *